US009986718B2

(12) United States Patent
Arab

(10) Patent No.: US 9,986,718 B2
(45) Date of Patent: Jun. 5, 2018

(54) AUTOMATED ANIMAL WASHING SYSTEMS

(71) Applicant: Anas Shakir Arab, Mekkah (SA)

(72) Inventor: Anas Shakir Arab, Mekkah (SA)

( * ) Notice: Subject to any disclaimer, the term of this patent is extended or adjusted under 35 U.S.C. 154(b) by 131 days.

(21) Appl. No.: 15/286,889

(22) Filed: Oct. 6, 2016

(65) Prior Publication Data

US 2017/0099805 A1 Apr. 13, 2017

Related U.S. Application Data

(60) Provisional application No. 62/239,096, filed on Oct. 8, 2015.

(51) Int. Cl.
*A01K 13/00* (2006.01)
*A01K 1/02* (2006.01)
*A01K 1/035* (2006.01)

(52) U.S. Cl.
CPC .......... *A01K 13/001* (2013.01); *A01K 1/0245* (2013.01); *A01K 1/035* (2013.01)

(58) Field of Classification Search
CPC ..... A01K 13/001; A01K 1/0245; A01K 1/035
USPC ........ 119/480, 482, 600, 602, 673, 603, 604
See application file for complete search history.

(56) References Cited

U.S. PATENT DOCUMENTS 3,884,191 A 5/1975 Stout
4,020,796 A 5/1977 Grifa
4,056,078 A 11/1977 Blafford et al.
4,505,229 A 3/1985 Altissimo
4,741,289 A 5/1988 Blose
4,782,792 A 11/1988 Anthony et al.
5,662,069 A 9/1997 Smith
5,794,570 A * 8/1998 Foster .................. A01K 13/001 119/673
6,688,257 B2 * 2/2004 Lee ...................... A01K 13/001 119/604
7,100,538 B2 9/2006 Motomura
(Continued)

FOREIGN PATENT DOCUMENTS

CN 201051822 4/2008

OTHER PUBLICATIONS

International Search Report issued in International Application No. PCT/IB2016/002016, dated Jul. 17, 2017, 3 pages.

*Primary Examiner* — Yvonne R Abbott-Lewis
(74) *Attorney, Agent, or Firm* — Doherty IP Law Group LLC

(57) ABSTRACT

An automated animal washing system includes a housing having a base, and a wash tub for holding water and an animal cage positioned atop the base. The system has a lid moveable between a closed position for covering an upper end of the wash tub and an open position for providing access to the upper end of the wash tub. The system includes at least one water pipe for introducing water into the wash tub, and a shampoo pipe for introducing shampoo or soap into the wash tub. A rotatable agitator is disposed at the lower end of the wash tub. A drain is also disposed at the lower end of the wash tub for removing water from the wash tub. The animal cage is disposed inside the wash tub. The animal cage has spaced legs that project from a bottom of the cage for spacing the cage away from the rotatable agitator. A control system is disposed in the base for automatically operating the animal washing system.

20 Claims, 14 Drawing Sheets

(56) References Cited

U.S. PATENT DOCUMENTS

| | | | | |
|---|---|---|---|---|
| 7,107,937 | B1 * | 9/2006 | Anderson | A01K 13/001 119/665 |
| 7,421,978 | B2 * | 9/2008 | Price | A01K 13/001 119/604 |
| 7,497,188 | B2 | 3/2009 | Cho | |
| 8,186,307 | B2 * | 5/2012 | Moharram | A01K 13/001 119/651 |
| 8,276,546 | B2 * | 10/2012 | Makarian | A01K 13/001 119/671 |
| 2006/0169219 | A1 | 8/2006 | Yaghmai et al. | |
| 2009/0101077 | A1 | 4/2009 | Shaham | |
| 2011/0017147 | A1 | 1/2011 | Petruzzi | |
| 2012/0037085 | A1 | 2/2012 | Caisse | |
| 2015/0189857 | A1 | 7/2015 | Qirjazi | |

* cited by examiner

AUTOMATED ANIMAL WASHING SYSTEMS

CROSS-REFERENCE TO RELATED APPLICATIONS

The present patent application claims benefit of U.S. Provisional Application Ser. No. 62/239,096, filed Oct. 8, 2015, the disclosure of which is hereby incorporated by reference herein.

BACKGROUND OF THE INVENTION

Field of the Invention

The present patent application is generally related to washing and bathing domestic animals, and is more specifically related to systems, devices, and methods for washing and drying domestic animals such as cats and dogs.

Description of the Related Art

There have been a number of developments directed to washing domestic animals and pets such as cats and dogs. For example, U.S. Pat. No. 3,884,191 to Stout discloses an animal bathing and drying apparatus for dogs including a container provided with means for spraying water and/or cleaning solution onto the animal being bathed. The container has a bottom wall adapted to be inclined by the weight of an animal thereon for draining water from the container. After the water is shut off, drying air is forced through the same pipes used for spraying water into the container. The washing and drying apparatus includes an adjustable member for engaging the neck of an animal to restrain the animal during bathing and drying.

U.S. Pat. No. 4,020,796 in Grifa discloses a portable animal bathing apparatus including a box-like enclosure having a normally open top and including bottom, end, and side walls. The enclosure has a removable top covering member, and a network of perforated spray pipes is disposed inside the enclosure. An extension pipe is provided to attach the spray pipe network to a source of water. The enclosure has a drain outlet provided in the bottom wall. One of the end walls has a head-receiving opening that enables the head of an animal to be maintained outside the enclosure. The enclosure has a floor member disposed inside the enclosure and that is elevated above the bottom wall, the floor member having perforations formed therein for drainage purposes.

U.S. Pat. No. 4,056,078 to Blafford et al. discloses a dog cleaning apparatus with first and second enclosures sharing a common sidewall. Water spray heads are positioned in the first enclosure and are adapted to selectively discharge streams of soapy and clear water. The second enclosure is provided with a blower for introducing a stream of heated air into the second enclosure. A gate is mounted in the common wall between the two enclosures for selectively permitting the dog to leave the first enclosure to enter the second enclosure. A control mechanism is provided in the second enclosure for automatically activating the blower when the dog passes from the first enclosure to the second enclosure. The shower enclosure is provided with opposed side walls, one of which is the common wall shared with the drying enclosure, and with top and rear walls. The top and rear walls are pivotably connected and the top wall is pivotably connected to the side wall opposite the common wall.

U.S. Patent Application Publication No. 2006/0169219 to Yaghmai et al. discloses an automatic dog washing system that washes a dog by means of agitation. The agitation is accomplished by placing the dog in a whirlpool of warm water, which periodically reverses direction, therefore creating the same type of scrubbing effect as in a home washing machine, but without a solid agitator shaft in the middle or any solid bodies touching the dog. Soap and conditioner are dispensed into the whirlpool at various times during the process to assist in further cleaning and conditioning depending on which type of cleaning cycle the operator chooses on a control panel.

U.S. Patent Application Publication No. 2015/0189857 to Qirjazi discloses a shower for washing a pet. The shower has a housing with front and rear openings. An array of water jets that are coupled with the housing direct water towards an interior of the housing and an array of air vents coupled with the housing direct air towards an interior of the housing. A front gate is configured to at least partially close the front opening, and a rear door is configured to at least partially close the rear opening.

In spite of the above advances, there remains a need for improved systems, devices and methods for safely and effectively washing and drying domestic animals such as cats and dogs.

SUMMARY OF THE INVENTION

In one embodiment, an automated animal washing system preferably includes a housing having a base, a wash tub positioned atop the base, the wash tub having an open upper end, a closed lower end, and a side wall extending between the upper and lower ends, and a lid moveable between a closed position for covering the open upper end of the wash tub and an open position for providing access to the open upper end of the wash tub.

In one embodiment, the system desirably includes at least one water pipe for introducing water into the wash tub, a shampoo pipe for introducing shampoo into the wash tub, a rotatable agitator disposed at the lower end of the wash tub for circulating water inside the wash tub, and a drain disposed at the lower end of the wash tub for removing water from the wash tub.

In one embodiment, a cage adapted to hold an animal is disposed inside the wash tub. In one embodiment, the cage has spaced legs that project from a bottom of the cage for spacing the bottom of the cage away from the rotatable agitator so that the agitator may rotate for circulating water. The automated animal washing system preferably has a control system disposed in the base for automatically operating the animal washing system. The control system may be programmed with different protocols for automatically operating the animal washing system including controlling the water level, controlling the time of a wash and dry cycle, controlling the temperature of the water, controlling the temperature level of the hot air blowers, controlling the amount of shampoo, soap, conditioner, disinfectant, delousing agent, medicine, perfume and/or fragrance introduced into the wash tub.

In one embodiment, the side wall of the wash tub is transparent so that an operator can view the interior of the cage during a wash cycle and so that pets and animals inside the cage can see the pet owner at all times. In one embodiment, the side wall of the wash tub has a cylindrical shape. In one embodiment, the closed lower end of the wash tub has a bottom wall that forms a water tight seal with the cylindrical shaped side wall. The bottom wall of the wash tub may have a drain and the rotatable agitator may project above the bottom wall. In one embodiment, the rotatable agitator has fins or blades for circulating the water and/or liquids introduced into the wash tub.

In one embodiment, the rotatable agitator projects above the bottom wall of the wash tub, and the drain is positioned over an opening formed in the bottom wall of the wash tub. The automated animal washing system preferably has a motor or engine for operating the rotatable agitator. The system may also have pumps and valves for introducing water and liquids into the wash tub and removing the water and liquids from the wash tub (e.g., via the drain).

In one embodiment, water tight receptacles (e.g., depressions) are formed in the bottom wall of the wash tub. In one embodiment, the water tight receptacles extend below the bottom wall of the wash tub. The receptacles have a spacing that matches the spacing of the cage legs and the receptacles are adapted to receive the spaced legs projecting from an underside of the cage. In one embodiment, each spaced leg has a length that is greater than the length of the receptacle associated therewith so that the bottom of the cage is spaced away from the rotatable agitator that projects above the bottom wall of the wash tub, thereby enabling the agitator to rotate without contacting the cage.

In one embodiment, the cage includes a cage top overlying the bottom of the cage. In one embodiment, the cage top is moveable between a closed position for covering an open upper end of the bottom of the cage and an open position for providing access to the open upper end of the bottom of the cage. The cage is preferably opened for placing a pet or animal therein. The cage top may then be closed prior to placing the cage and the animal inside the wash tub. In one embodiment, the top cage and the bottom cage are connected together via one or more hinges. Other types of fasteners may be used for holding the top and bottom cage sections together, such as buckles, clips, hook and loop structures, threads, etc.

In one embodiment, the cage top has a top wall with a central opening and a door moveable between a closed position for covering the central opening and an open position for providing access to the central opening. When an animal is placed inside the cage, the door may be opened so that the animal's head and neck may project through the central opening and above the top of the cage.

In one embodiment, the cage is made of spaced metal rods that are joined together. The spaced metal rods preferably enable water to pass through the cage when the cage is placed in the wash tub. The cage may be made of aluminum or stainless steel. In one embodiment, the cage may be made of plastic or polymers.

In one embodiment, at least one hot air blower is located on an underside of the lid for drying an animal at the end of a wash cycle. The system controller may be used to program the operation of the hot air blower (e.g., controlling the temperature level and the length of the drying cycle). In one embodiment, the lid is bifurcated into first and second lid halves that open and close independently of one another. In one embodiment, the at least one hot air blower includes a first hot air blower located on an underside of the first lid half and a second hot air blower located on an underside of the second lid half.

In one embodiment, the lid includes a lid opening extending between the first and second lid halves. In one embodiment, the system preferably includes a faucet secured to the housing, the faucet having a dispensing end moveable between a first position in which the dispensing end of the faucet is aligned with the lid opening and a second position in which the dispensing end of the faucet is not in alignment with the lid opening. The faucet preferably overlies the top of the wash tub to provide a source of water and liquid above the animal's head. In one embodiment, the dispensing end of the faucet may dispense water, and other liquids including shampoo, soap, conditioner, disinfectants, medicine, purifiers, perfumes and/or fragrances.

In one embodiment, the wash tub includes a plurality of spaced vent openings formed in the side wall adjacent the open upper end of the wash tub. The vent openings allow air to enter and exit the wash tub when the lid is closed over the open upper end of the wash tub. The vents may also provide a path for sound to enter and exit the wash tub so that an owner may communicate with its pet when the pet is inside the wash tub.

In one embodiment, the system desirably includes a water inlet tube coupled with the housing and being in communication with the at least one water pipe for supplying water to the wash tub, and a water outlet tube coupled with the housing and being in communication with the drain for removing water from the wash tub. In one embodiment, the system includes a water heater for heating water to a desired temperature and/or maintaining the water at the desired temperature.

In one embodiment, the at least one water pipe preferably includes a plurality of water pipes disposed inside the wash tub and being coupled with a source of water, whereby each water pipe extends vertically between the upper and lower ends of the wash tub, and whereby each water pipe has a plurality of spaced openings for introducing water into the wash tub.

In one embodiment, the shampoo pipe is preferably disposed inside the wash tub and is coupled with a source of shampoo, whereby the shampoo pipe extends vertically between the upper and lower ends of the wash tub, and whereby the shampoo pipe has a plurality of spaced openings for introducing the shampoo into the wash tub.

In one embodiment, the system preferably includes a disinfectant pipe disposed inside the wash tub and being coupled with a source of disinfectant, whereby the disinfectant pipe extends vertically between the upper and lower ends of the wash tub, and whereby the disinfectant pipe has a plurality of spaced openings for introducing the disinfectant into the wash tub.

In one embodiment, the system desirably includes a perfume pipe disposed inside the wash tub and being coupled with a source of perfume, whereby the perfume pipe extends vertically between the upper and lower ends of the wash tub, and whereby the perfume pipe has a plurality of spaced openings for introducing the perfume into the wash tub.

In one embodiment, the system preferably has a solution reservoir located on the housing. In one embodiment, the solution reservoir desirably includes a shampoo compartment for supplying the shampoo to the shampoo pipe, a disinfectant compartment for supplying the disinfectant to the disinfectant pipe, and a perfume compartment for supplying the perfume to the perfume pipe. In one embodiment, the different liquids may be pre-loaded into a disposable cartridge that is inserted into and/or coupled with the housing or the wash tub.

In one embodiment, the system preferably includes a water level controller and a timer controller that are in communication with the control system. In one embodiment, the control system desirably includes a central processing unit containing one or more operational protocols for controlling operation of the automated animal washing system, one or more memory devices, and circuitry for controlling operation of the automated animal washing system.

In one embodiment, the system has a first motor in communication with the control system for controlling operation of the rotatable agitator disposed in the wash tub, at least one pump for drawing water into the wash tub and discharging water from the wash tub, a liquid dispensing motor that controls the amount of shampoo, soap, conditioner, disinfectant, and/or perfume introduced into the wash tub, and a hot air generator that generates hot air that is introduced into the wash tub via the at least one hot air blower provided on an underside of the lid.

In one embodiment, the control system is preferably in communication with and controls operation of the first motor, the pump, the second motor, and the hot air generator. In one embodiment, the control system preferably includes one or more protocols for operating the first and second motors, the pump, valves, and the hot air generator.

One benefit of using the cage for holding the animal or pet is that it is easier to control the animal/pet when immersing the animal/pet in the water inside the wash tub and an operator can confirm that the water temperature is safe and comfortable for the animal/pet before immersing the animal/pet in the water.

These and other preferred embodiments of the present patent application will be described in more detail below.

DETAILED DESCRIPTION OF PREFERRED EMBODIMENTS

Figure 1A:
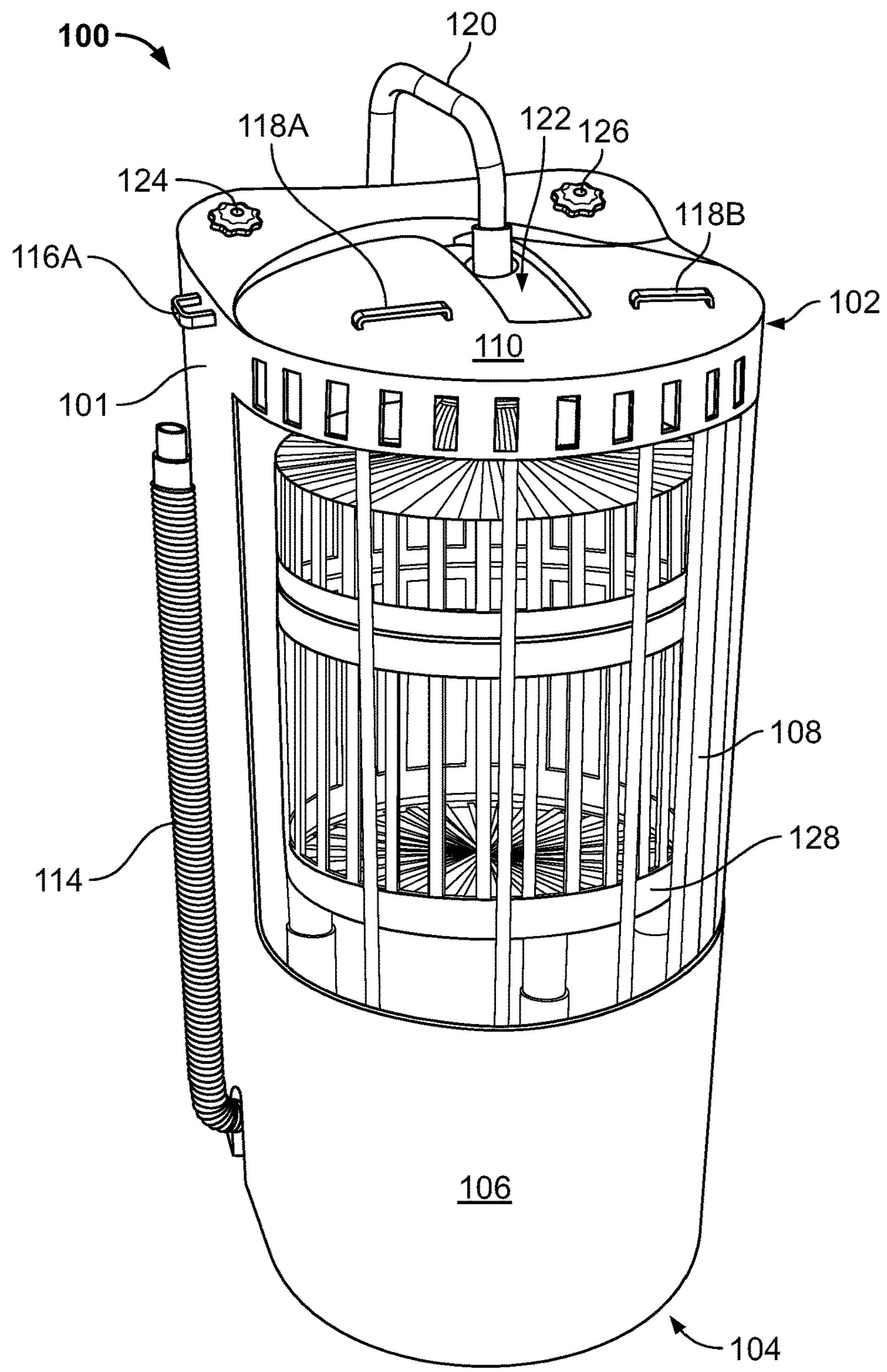
FIGS. 1A-1C show an automated animal washing system, in accordance with one embodiment.
Figures 1B, 1C:
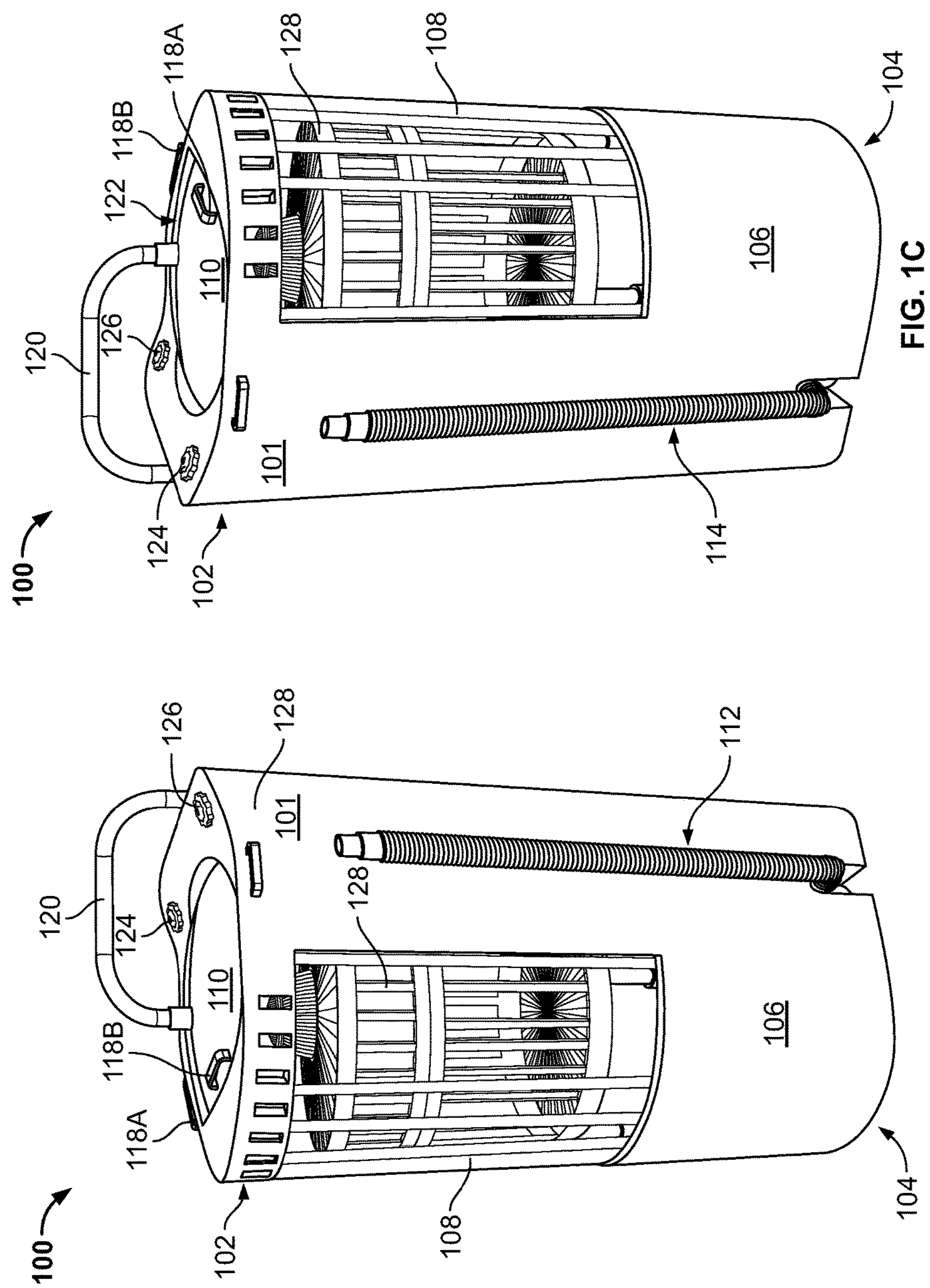

Referring to FIGS. 1A-1C, in one embodiment, an automated animal washing system 100 preferably has a housing 101 with an upper end 102 and a lower end 104. The automated animal washing system 100 includes a base 106, which may be part of the housing 101, adjacent the lower end 104, a wash tub 108 that sits atop the base 106 and a lid 110 that covers the upper end of the wash tub 108. The lid may be opened for providing access to the wash tub and closed for covering the open top of the wash tub. The automated animal washing system 100 preferably includes a water inlet tube 112 for introducing water into the wash tub and a water outlet tube 114 for discharging water and/or liquid from the wash tub. The automated animal washing system 100 desirably includes carry handles 116A, 116B disposed on opposite sides of the upper end 102 of the housing for lifting and moving the automated animal washing system from one location to another.

In one embodiment, the automated animal washing system 100 includes lid handles 118A, 118B for lifting the lid 110 and moving the lid between a closed position and an open position. In one embodiment, the automated animal washing system 100 includes a faucet 120 having a plurality of openings for dispensing water, shampoo, soap, antiseptic, delousing agent, and/or perfume through the lid opening 122 provided in the lid 110.

In one embodiment, the automated animal washing system 100 includes a water level controller 124 (e.g., a button or rotatable knob) for controlling the volume of water introduced into the wash tub 108, and a timer control 126 (e.g., a button or rotatable knob) for controlling the time length of a wash and dry cycle.

In one embodiment, the automated animal washing system 100 includes a cage 128 that is adapted to receive an animal such as a dog or cat. In one embodiment, after an animal is positioned with the cage 128, the cage is inserted into the wash tub 108 for conducting an automated washing and drying operation on the animal. In one embodiment, an upper end of the cage has an opening for an animal's head and neck to project from the upper end of the cage.

Figure 2:
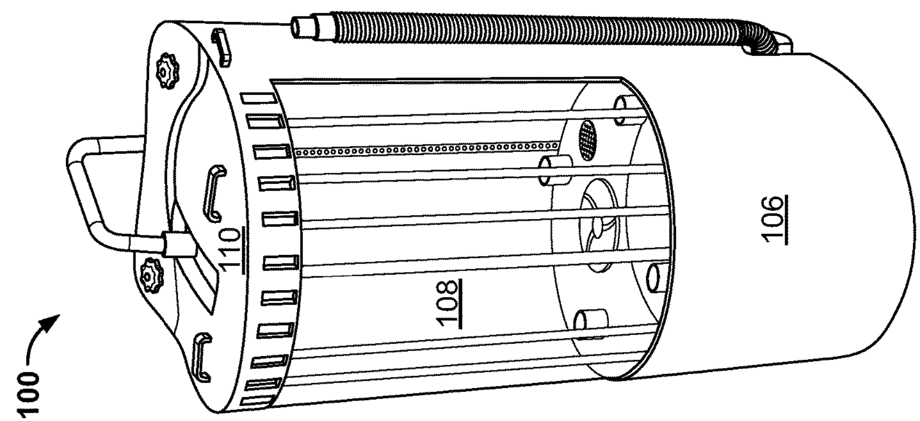
FIG. 2 shows a perspective view of an automated animal washing system including a housing, a wash tub and a cage insertable into the wash tub, in accordance with one embodiment.

Referring to FIG. 2, in one embodiment, the lid 110 of the automated animal washing system 100 is opened for providing access to an opening at the upper end of the wash tub 108. Once the lid 110 is opened, the cage 128 containing an animal may be inserted into the wash tub 108.

Figure 3:
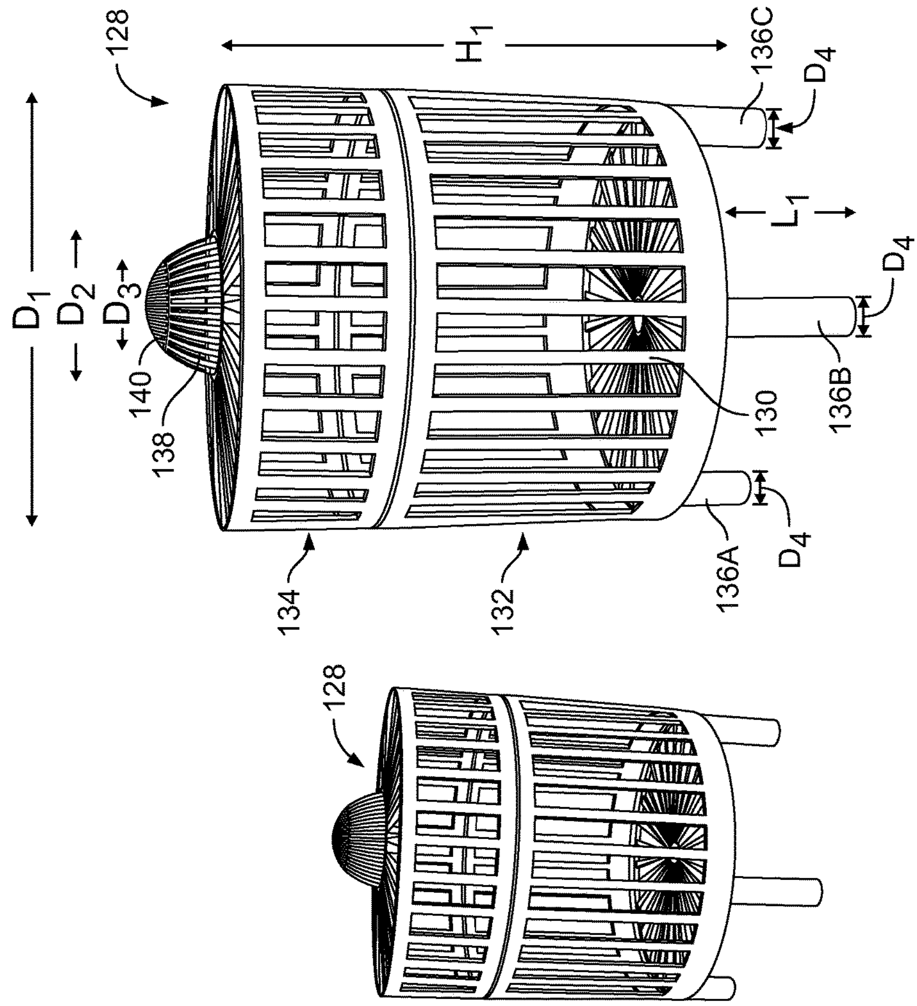
FIG. 3 shows the cage of FIG. 2, the cage including a cage bottom, a cage top, a dome, and a dome door covering the top of the dome.

Referring to FIG. 3, in one embodiment, the cage 128 is made of metal such as aluminum or stainless steel. The cage may also be made of plastic. In one embodiment, the cage is porous so that water and liquid may pass through and circulate through the cage. In one embodiment, the cage 128 has spaced supports 130 or rods that are spaced from one another so that water may pass between the supports 130. In one embodiment, the supports 130 are spaced about 0.78" from one another. In one embodiment, the cage 128 has an outer diameter $D_1$ of about 10-12 inches and more preferably about 11.81 inches, and a height $H_1$ of about 10-12 inches and more preferably about 11.81 inches.

In one embodiment, the cage 128 preferably includes a cage bottom 132 and a cage top 134 that selectively covers the cage top. In one embodiment, the cage top 134 is hingedly connected with the cage bottom 132 for moving between the closed position shown in FIG. 3 and an open position. In one embodiment, the cage 128 includes spaced legs 136A-136D that project from the bottom of the cage bottom for seating the cage inside the wash tub 108 (FIG. 2) as will be described in more detail herein.

In one embodiment, the cage top 134 has a dome 138 having a door 140 that covers a door opening. When an animal is positioned inside the cage 128, the door 140 may be opened so that an animal's head and neck can project through the door opening. In one embodiment, the dome 138 has a diameter $D_2$ of about 3-4 inches and more preferably about 3.93 inches, and the dome has a height $H_2$ of about 1-3 inches and more preferably about 1.96 inches. In one embodiment, the door 140 at the top of the dome 138 has a diameter $D_3$ of about 2-3 inches and more preferably about 2.46 inches.

In one embodiment, each cage leg 136A-136D has a length $L_1$ of about 3-5 inches and more preferably about 3.93 inches, and each leg has a diameter $D_4$ of about 0.5-1.5 inches and more preferably about 1.08 inches. As will be described in more detail herein, in one embodiment, the cage legs 136A-136D are inserted into water-tight receptacles formed in the bottom of the wash tub 108 (FIG. 2), whereby the cage bottom sits above the bottom floor of the wash tub.

Figure 4B:
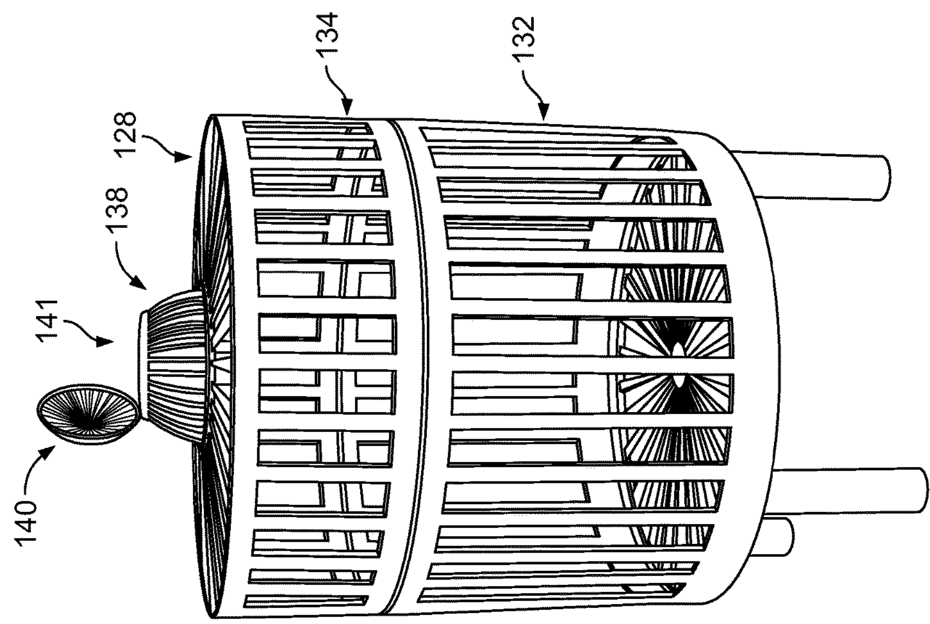
FIG. 4B shows the cage top in a closed position relative to the cage bottom and the dome door in an open position relative to the dome.
Figure 4A:
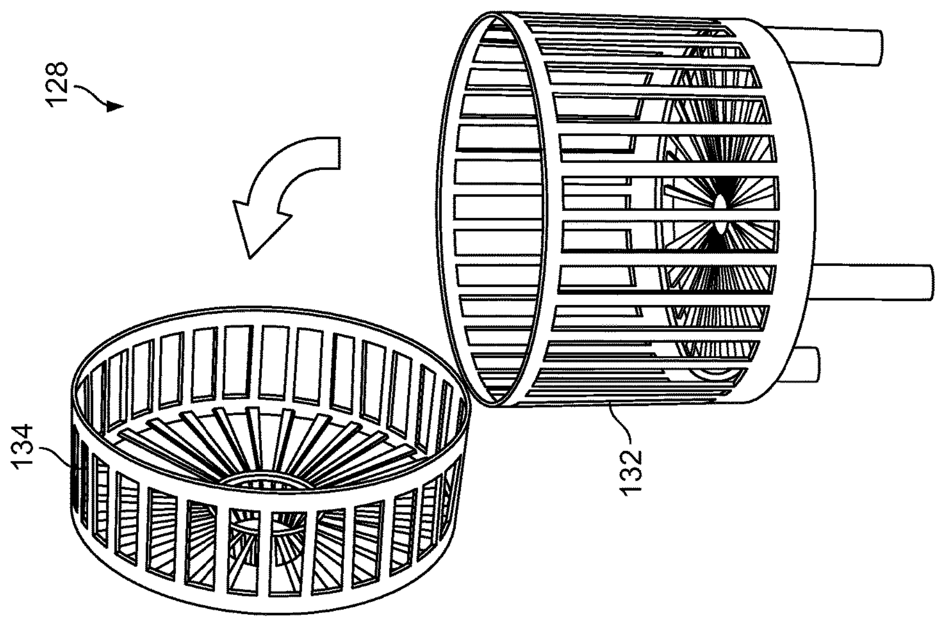
FIG. 4A shows the cage of FIG. 3 with the cage top in an open position relative to the cage bottom.

Referring to FIG. 4A, in one embodiment, the cage top 134 may be pivoted away from the upper end of the cage bottom 132 to open the cage 128. In the open position shown in FIG. 4A, an animal may be inserted into the cage bottom 132.

Referring to FIG. 4B, after an animal has been inserted into the cage 128, the cage top 134 may be closed over the cage bottom 132. In one embodiment, the dome door 140 may be opened to enable an animal to stick its head and neck through the door opening 141. As a result, an animal inside the cage 128 may have its head and neck projecting through the door opening 141 and above the dome 138.

Figure 5A:
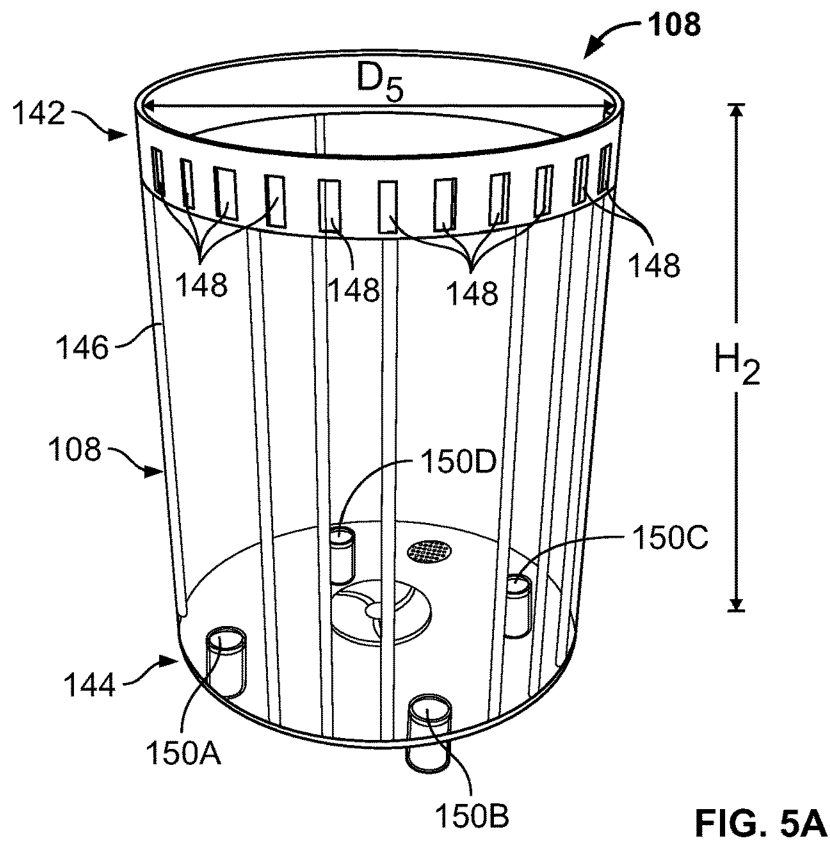
FIGS. 5A-5C show a wash tub for an automated animal washing system, in accordance with one embodiment.
Figure 5B:
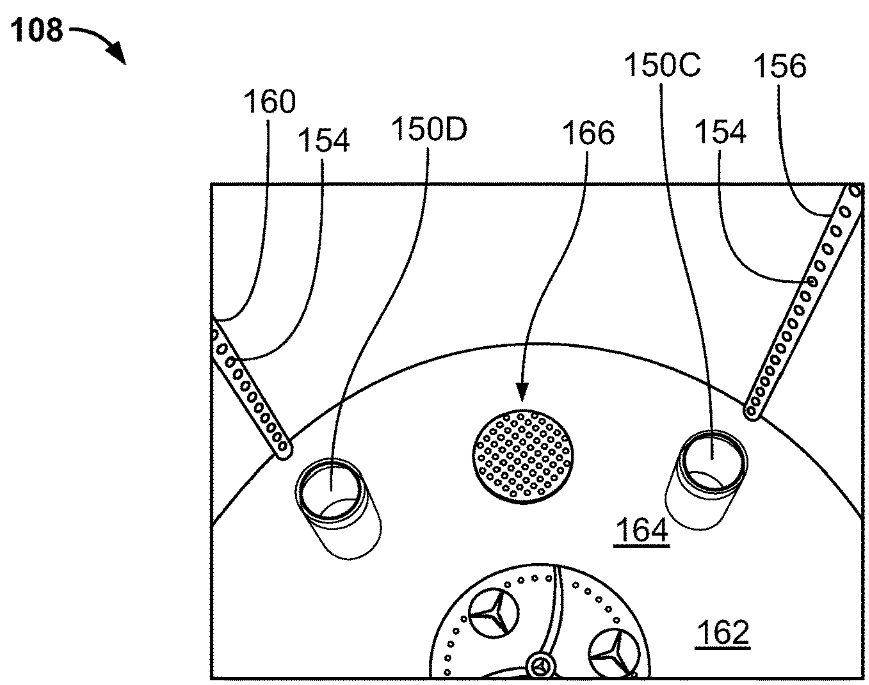
Figure 5C:
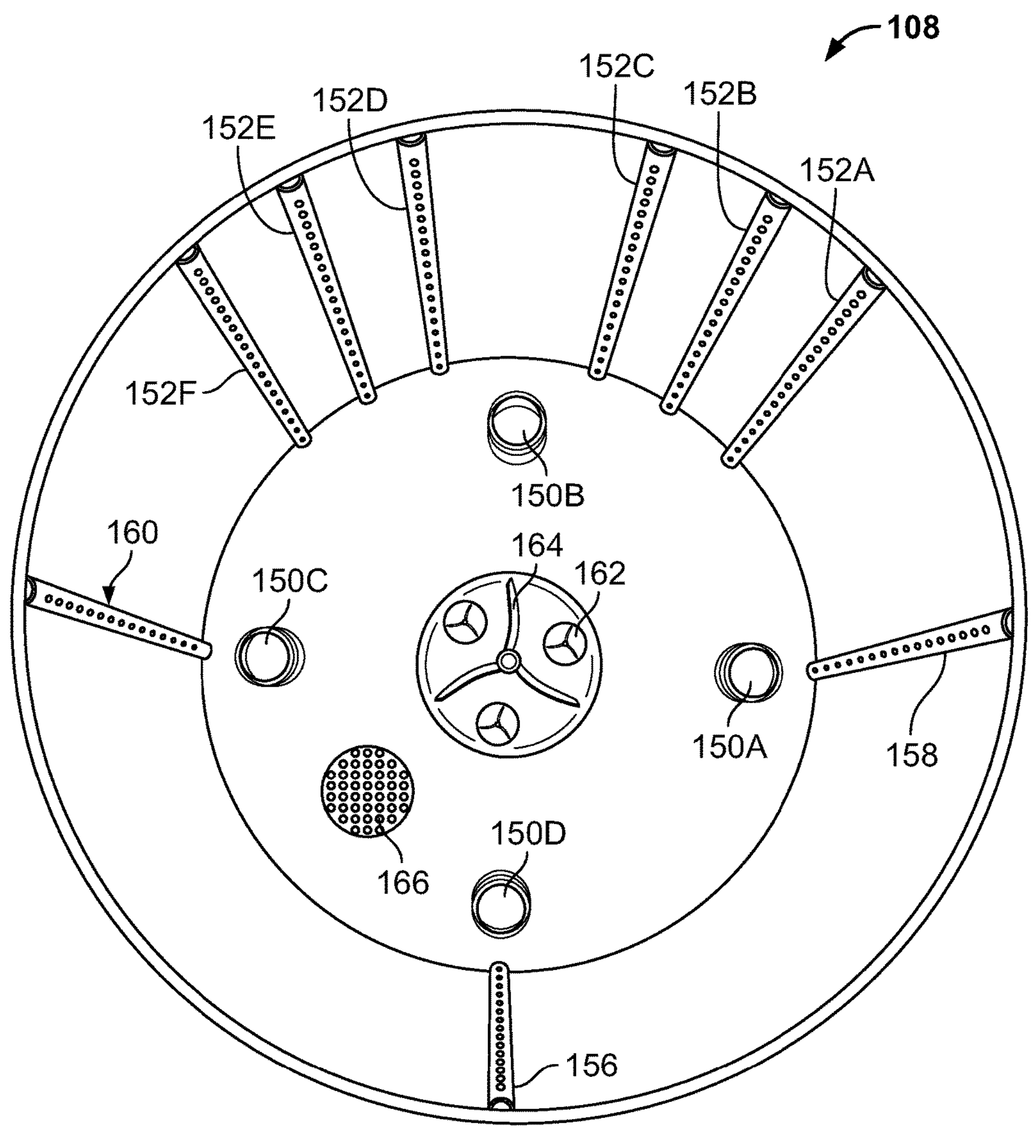

Referring to FIGS. 5A-5C, in one embodiment, the wash tub 108 preferably has an open upper end 142, a closed lower end 144 and cylindrical shaped side wall 146 that extends from the open upper end 142 to the closed lower end 144. The cylindrical shaped side wall 146 is preferably made of clear or transparent plastic or polymer materials. In one embodiment, the open upper end 142 of the wash tub defines a diameter $D_5$ of about 10-15 inches and more preferably about 13.77 inches. In one embodiment, the wash tub 108 has a height $H_2$ of about 15-20 inches and more preferably about 17.71 inches.

In one embodiment, the upper end 142 of the wash tub 108 has spaced vents 148 adjacent the upper end 142 that are adapted to enable air to flow into and out of the wash tub 108. The vents 148 are particularly useful when the lid 110 is closed over the top of the wash tub for allowing air to pass into and out of the wash tub through the spaced vents 148. In one embodiment, the spacing between the vents is about 1-2 inches and more preferably about 1.181 inches. In one embodiment, the vents 148 are located adjacent the upper end of the wash tube, preferably within 2 inches or less from the upper end of the wash tub.

In one embodiment, the lower end 144 of the wash tub 108 includes four spaced, water-tight receptacles 150A-150D that match the spacing of and are adapted to receive the corresponding legs 136A-136D projecting from the underside of the cage bottom 132 (FIG. 3).

In one embodiment, the lower end 144 of the wash tub 108 and the receptacles 150A-150D are water-tight so that water and liquid cannot escape from the bottom of the wash tub 108.

In one embodiment, the wash tub 108 includes water dispensing pipes 152A-152F that extend between the upper end 142 and the lower end 144 of the wash tub 108. In one embodiment, each water dispensing pipe 152A-152F includes spaced openings 154 that are adapted to dispense water and/or liquid into the wash tub 108.

In one embodiment, the wash tub 108 includes a shampoo dispensing pipe 156 that is adapted to dispense shampoo and/or soap into the wash tub 108. In one embodiment, the shampoo dispensing pipe 156 includes spaced openings that are adapted to dispense shampoo and/or soap into the wash tub 108.

In one embodiment, the wash tub 108 includes an antiseptic dispensing pipe 158 adapted to dispense an antiseptic, delousing agent, and/or medicine into the wash tub, and a perfume dispensing pipe 160 adapted to dispense a perfume and/or fragrance into the wash tub 108.

As shown in FIG. 5B, each of the dispensing pipes 156, 160 includes a series of spaced openings 154 for dispensing water, shampoo, soap, antiseptic, delousing agent, medicine, conditioner, and/or perfume into the wash tub 108 for use during a washing and drying operations.

Referring to FIGS. 5B and 5C, in one embodiment, the wash tub 108 includes an agitator for agitating the water loaded into the wash tub. In one embodiment, the agitator includes a rotatable agitator 162 having blades 164 disposed at the bottom of the wash tub 108. In one embodiment, the rotatable agitator projects from a bottom floor of the wash tub. As will be described in more detail herein, during a wash cycle, a motor rotates the agitator 162 for agitating the water and/or liquid disposed in the wash tub 108. The rotatable agitator may rotate continuously in one direction or may change directions (e.g., alternating between clockwise and counterclockwise rotations).

In one embodiment, the wash tub 108 preferably includes a drain 166 for draining water and/or liquid from the wash tub. In one embodiment, a filter is in communication with the drain 166 for removing hair and/or debris from the water and liquid drained from the wash tub.

Figures 6A, 6B:
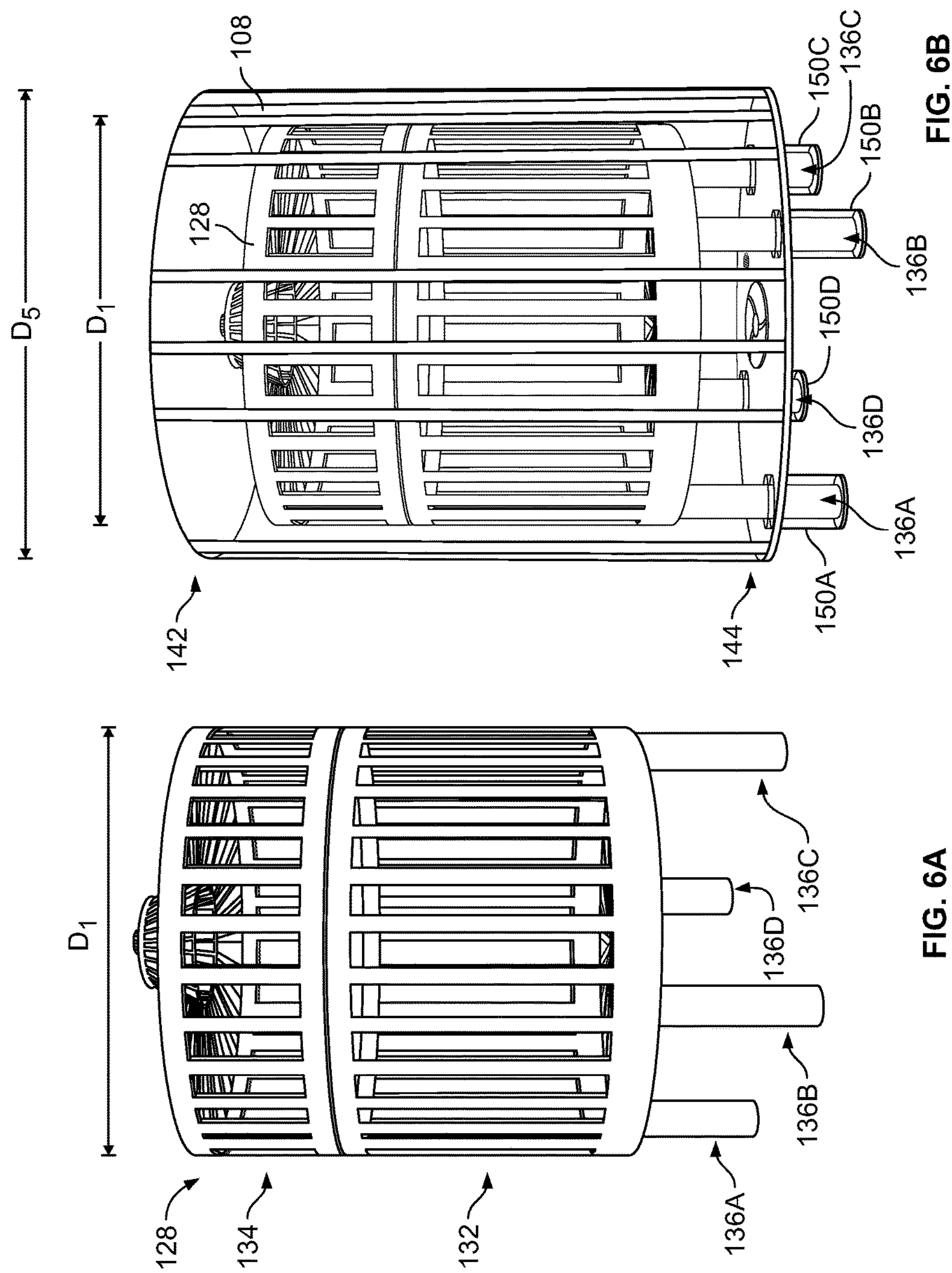
FIGS. 6A-6B show a method of inserting a cage into a washtub of an automated animal washing system, in accordance with one embodiment of the invention.

Referring to FIGS. 6A and 6B, in one embodiment, the animal cage 128 includes the cage bottom 132 having legs 136A-136D projecting from the underside thereof. The cage top 134 is adapted to close over the opening at the upper end of the cage bottom 132.

In one embodiment, after an animal is loaded in the cage 128, the cage may be placed into the opening at the upper end 142 of the wash tub 108. In one embodiment, the diameter $D_1$ of the animal cage 128 is less than the diameter $D_5$ of the wash tub 108. In one embodiment, the legs 136A-136D are inserted into the water-tight receptacles 150A-150D formed in the lower end 144 of the wash tub 108. The floor of the cage bottom is preferably spaced away from the floor of the wash tub floor so that that the agitator 162 (FIG. 5C) at the wash tub floor has sufficient room to move. The cross sectional diameters of the legs 136A-136D of the animal cage 108 are preferably less than the respective cross sectional diameters of the associated receptacles 150A-150D formed in the floor at the lower end 144 of the wash tub 108.

Figure 7:
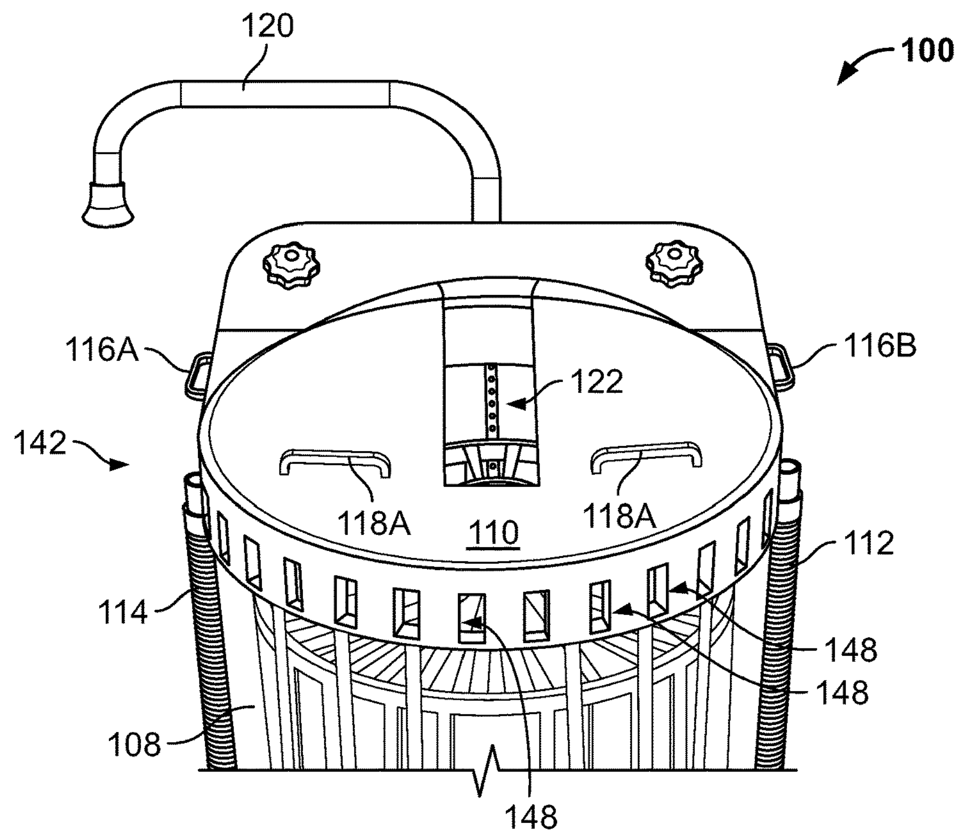
FIG. 7 shows a front perspective view of an upper end of an automated animal washing system including a faucet positioned away from a lid opening of a lid that covers a wash tub, in accordance with one embodiment.

Referring to FIG. 7, in one embodiment, the automated animal washing system 100 preferably includes the faucet 120 that overlies the lid 110. In one embodiment, the faucet 120 includes one or more openings for dispensing water, one or more openings for dispensing soap or shampoo, one or more openings for dispensing antiseptic, delousing agent or medicine, and one or more openings for dispensing perfume. One or more openings may also be used for dispensing conditioner. In one embodiment, the faucet 120 overlies the lid 110 and the upper end of the cage 128 disposed inside the wash tub 108. In one embodiment, the dispensing end of the faucet 120 may be aligned with the lid opening 122 for dispensing water, shampoo, antiseptic, and/or perfume into the lid opening 122 and over the top of the cage 128. In one embodiment, the faucet 120 is able to move from a position in which the dispensing end of the faucet is aligned with the lid opening 122 and a position in which the dispensing end of the faucet 120 is moved away from and not is alignment with the lid opening 122. FIG. 7 shows the faucet 120 in a retracted position whereby the dispensing end of the faucet is not aligned with the lid opening 122.

In one embodiment, the automated animal washing system 100 desirably includes the water inlet tube 112 for introducing water and/or liquid into the system and a water discharge tube 114 for removing water and/or liquid from the system. The automated animal washing system 100 preferably includes carry handles 116A, 116B for lifting and carrying the housing, and lid handles 118A, 118B for opening and closing the lid 110.

In one embodiment, the upper end 142 of the wash tub 108 includes the spaced vents 148 for enabling air to enter and exit from the wash tub 108 when the lid 110 is in the closed position.

Figure 8:
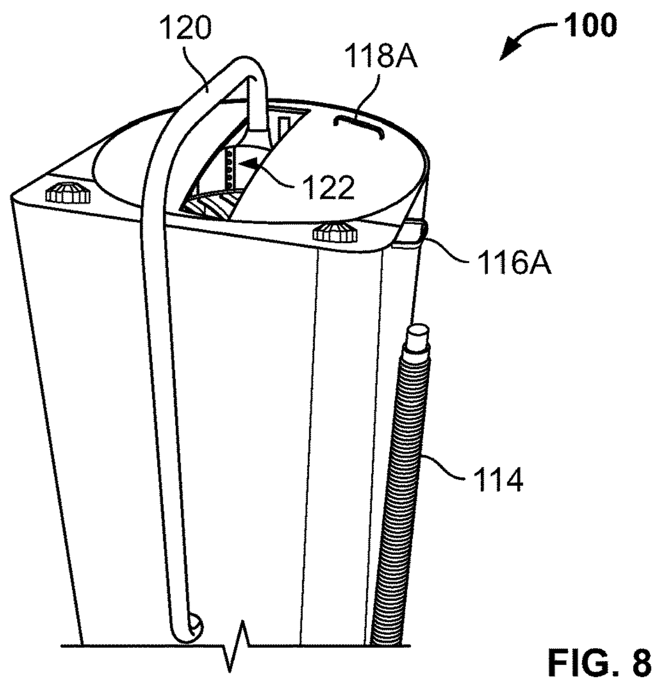
FIG. 8 shows a rear perspective view of the automated animal washing system of FIG. 7 with the faucet in alignment with the lid opening.

FIG. 8 shows the dispensing end of the faucet 120 aligned with the lid opening 122 for dispensing water, shampoo, antiseptic, and/or perfume over the top of a cage inserted into the wash tub. In one embodiment, the faucet 110 may be lifted and rotated relative to the lid 110 for swinging the dispensing end of the faucet 120 between a first position in which the dispensing end is aligned with the lid opening 122 and a second position in which the dispensing end of the faucet is not aligned with the lid opening 122. In one embodiment, the faucet 120 is able to move vertically relative to the lid 110 and swing to the side relative to the lid 110 (e.g., to the left, the right, and the rear).

Figures 9A, 9B, 9C:
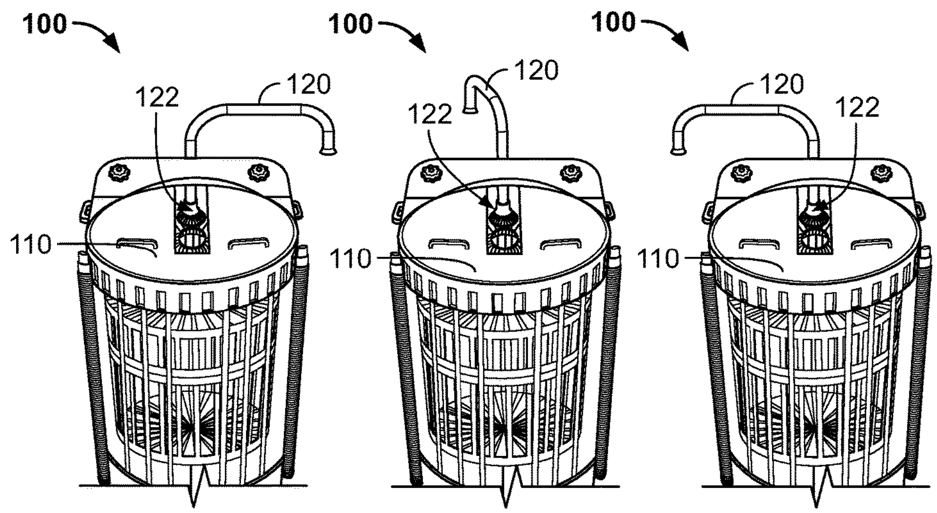
FIG. 9A shows a front perspective view of an upper end of an automated animal washer having a faucet positioned to the right and away from a lid opening, in accordance with one embodiment.
FIG. 9B shows the automated animal washing system of FIG. 9A with the faucet positioned to the rear and away from the lid opening.
FIG. 9C shows the automated animal washing system of FIG. 9A with the faucet positioned to the left and away from the lid opening.

Referring to FIG. 9A, in one embodiment, the faucet 120 of the automated animal washing system 100 has a first position in which the dispensing end of the faucet 120 is swung to the right and is not aligned with the lid opening 122. FIG. 9B shows a second position for the faucet 120 in which the dispensing end is rotated to the rear and is not aligned with the lid opening 122. FIG. 9C shows another position in which the faucet 120 is rotated to the left so that the dispensing end is not aligned with the lid opening 122.

Figure 10:
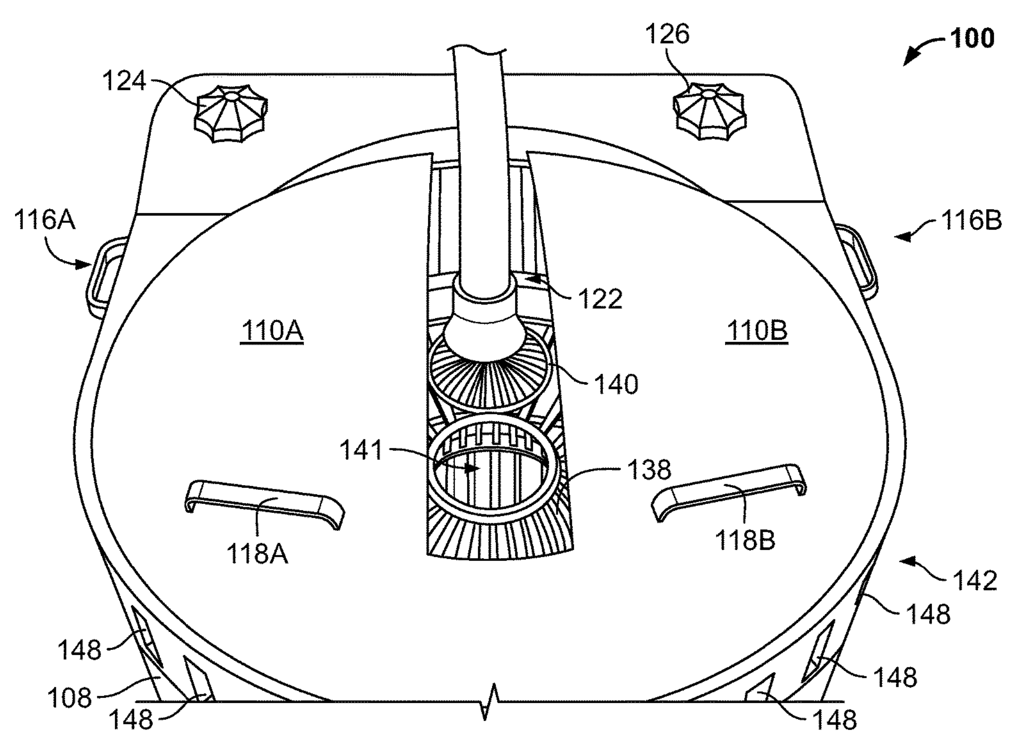
FIG. 10 shows a front perspective view of an upper end of the automated animal washing system of FIGS. 9A-9C with the lid closed and the faucet aligned with the lid opening.

Referring to FIG. 10, in one embodiment, the lid 110 has lid handles 118A, 118B that may be grasped for opening and closing the lid 110 at the upper end 142 of the wash tub 108. In one embodiment, the lid 110 may be bifurcated into first and second lid halves 110A, 110B that may be opened and closed independently of one another. In one embodiment, the lid opening 122 extends between the first and second lid halves 110A, 110B. The lid opening 122 is preferably aligned with the dome 138 and the door 140 of the cage 128 (FIG. 3) when the cage is inserted into the wash tub 108. In one embodiment, the door 140 of the dome 138 may be opened so that an animal inside the cage may have its head and neck pass through the door opening 141 defined by the outer perimeter of the door 140. In one embodiment, when the dispensing end of the faucet 120 is moved into alignment with the lid opening 122, the dispensing end is preferably aligned with the door 140 that covers the door opening 141. As a result, when an animal is disposed inside the cage, water, shampoo, antiseptic, and/or perfume may be dispensed directly onto an animal's head.

In one embodiment, the upper end 142 of the wash tub 108 includes vents 148 that enable air to enter into and escape from the wash tub 108, particularly when the lid 110 is closed over the open, upper end 142 of the wash tub 108.

In one embodiment, the automated animal washing system 100 preferably includes carry handles 116A, 116B that enable the system to be lifted and moved from one location to another.

Figure 11:
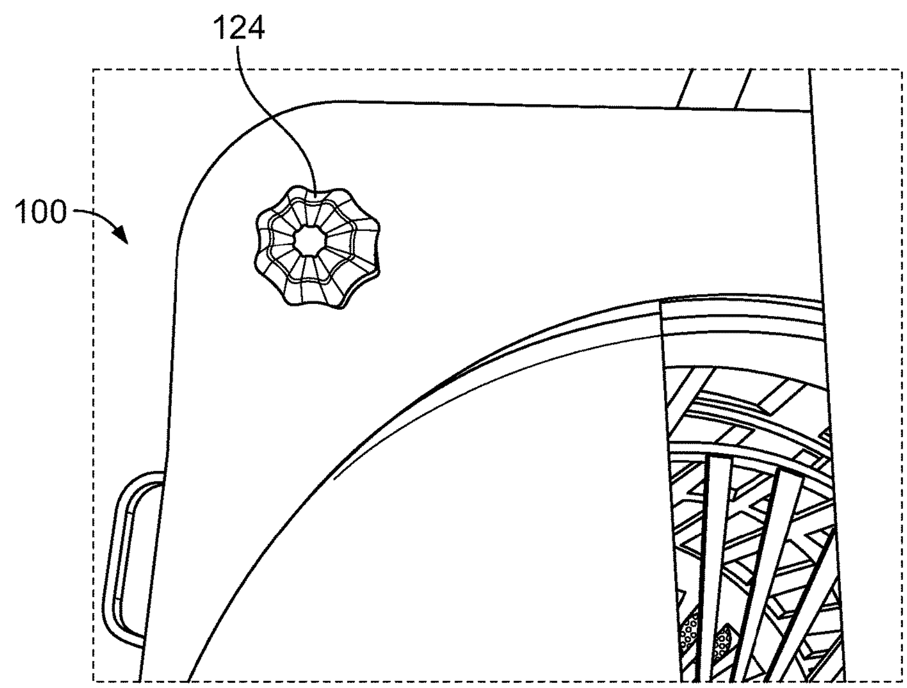
FIG. 11 shows a water level controller for an automated animal washing system, in accordance with one embodiment.

Referring to FIGS. 10 and 11, in one embodiment, the automated animal washing system 100 includes a water level control knob 124 that may be engaged for controlling the amount of water introduced into the wash tub 108. In one embodiment, the water lever control knob 124 is rotated in a clockwise direction for increasing the amount of water introduced into the wash tub.

Figure 12:
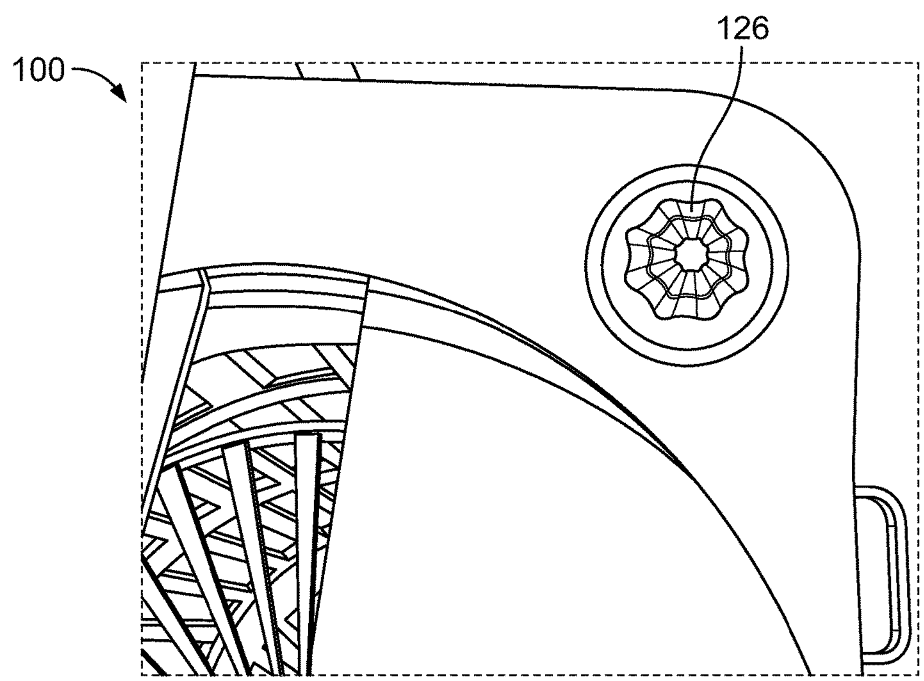
FIG. 12 shows a time controller for an automated animal washing system, in accordance with one embodiment.

Referring to FIGS. 10 and 12, in one embodiment, the automated animal washing system 100 includes a timer 126 for controlling the length of a washing and drying cycle. In one embodiment, the timer control knob 126 is rotated in a clockwise direction for changing the amount of time and/or duration of a washing and drying cycle. In one embodiment, a larger animal may require a greater volume of water inside the wash tub 108. In one embodiment, a dirtier animal may require a longer wash cycle.

Figure 13:
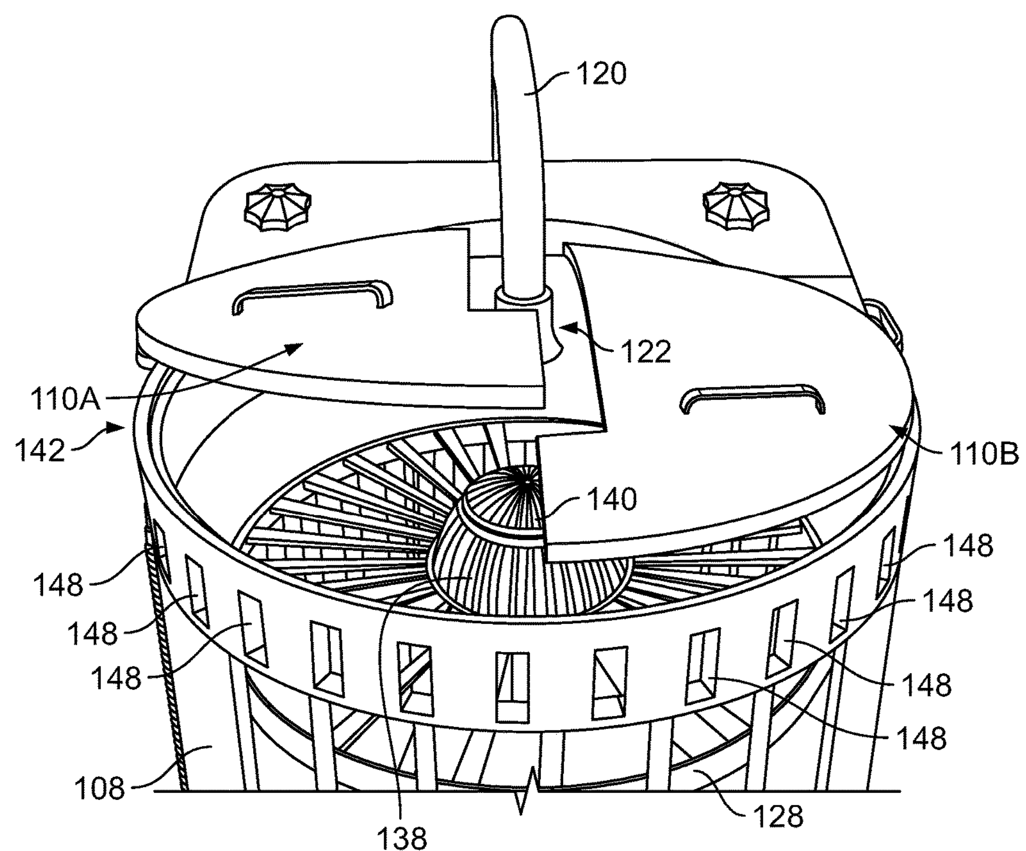
FIG. 13 shows a front perspective view of an upper end of an automated animal washing system having a lid with first and second lid halves that open and close independently of one another, in accordance with one embodiment.

Referring to FIG. 13, in one embodiment, the lid 110 that covers the upper end of the wash tub 108 preferably includes a first lid half 110A and a second lid half 110B. The first and second lid halves desirably open and close independently of one another for covering the opening at the upper end 142 of the wash tub 108. In one embodiment, after the cage 128 has been inserted into the wash tub 108, the lid halves 110A, 110B may be closed for covering the dome 138 and the door 140 at the upper end of the cage. In one embodiment, the first and second lid halves 110A, 110B may be opened and closed with the dispensing end of the faucet 120 aligned with the lid opening 122.

The upper end 142 of the wash tub 108 preferably includes the spaced vents 148 for enabling air to enter into and flow out of the wash tub 108 when the lid 110 is closed.

Figure 14:
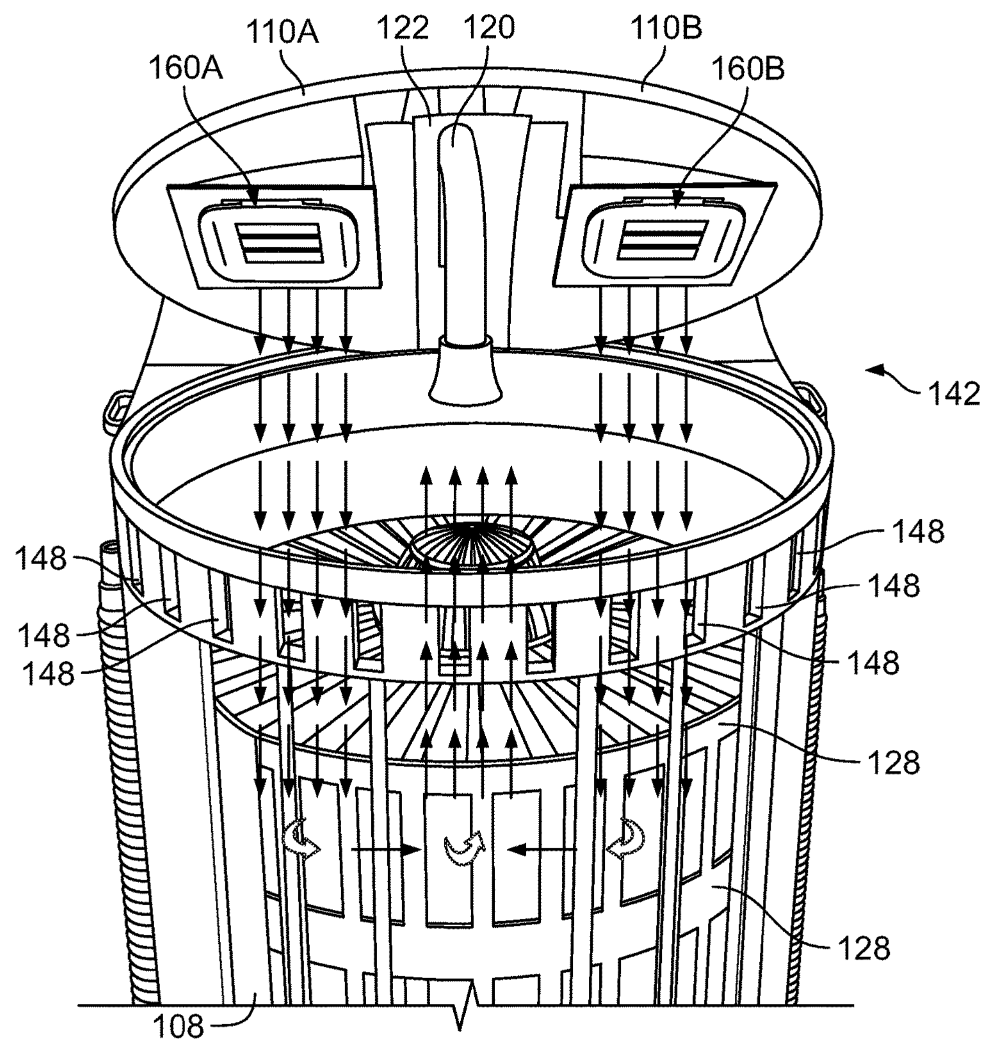
FIG. 14 shows the underside of the first and second lid halves of the automated animal washing system of FIG. 13, each lid half having a hot air blower, in accordance with one embodiment.

Referring to FIG. 14, in one embodiment, the first lid half 110A has a first hot air blower 160A provided at an underside thereof for blowing hot air toward the top of the cage 128 for drying an animal disposed inside the cage. In one embodiment, the second lid half 110B has a second hot air blower 160B for blowing hot air onto an animal disposed inside the cage 128. The first and second hot air blowers 160A, 160B preferably operate independently of one another. In one embodiment, when the lid 110 is fully closed over the opening at the upper end 142 of the wash tub 108, the first and second hot air blowers 160A, 160B may be activated for directing hot air toward the cage 128 and the lower end of the wash tub 108. In one embodiment, the hot air flows toward the bottom of the wash tub 108, and then exits from the wash tub 108 via the lid opening 122 extending between the first and second lid halves 110A, 110B. In one embodiment, hot air may also exit via the spaced vents 148 provided adjacent the upper end 142 of the wash tub 108.

Figure 15:
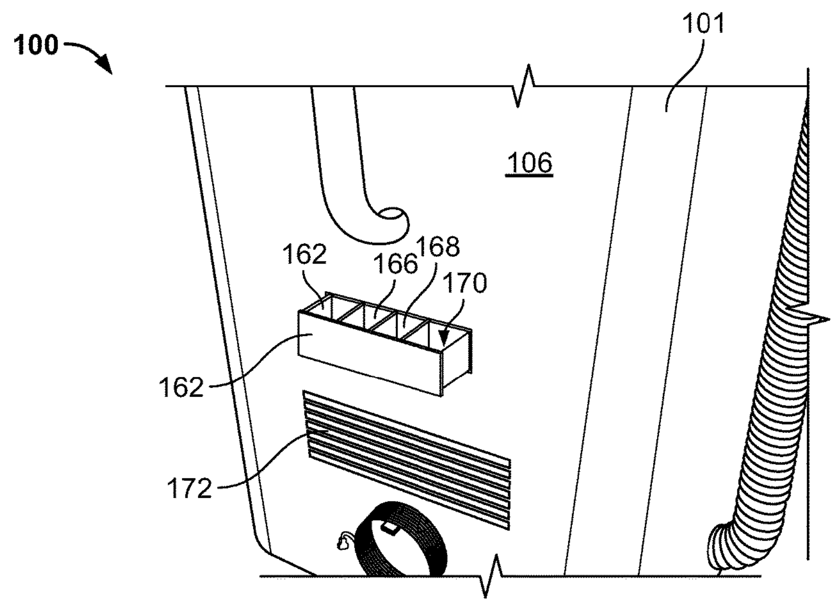
FIG. 15 shows a base of an automated animal washing system including a reservoir for holding solutions introduced into a wash tub and a vent for allowing heat to escape from the base, in accordance with one embodiment.

Referring to FIG. 15, in one embodiment, the automated animal washing system 100 preferably includes a solution reservoir 162 provided on the rear of the base 106 of the housing 101. In one embodiment, the solution reservoir 162 includes a first compartment 164 adapted to receive shampoo, a second compartment 166 adapted to receive soap, a third compartment 168 adapted to receive an antiseptic, medicine or delousing agent, and a fourth compartment 170 adapted to receive perfume. In one embodiment, one of the compartments may receive conditioner or another treatment solution. In one embodiment, the shampoo, soap, antiseptic, and perfume solutions are poured into the respective compartments 164, 166, 168, 170. In one embodiment, the solution reservoir 162 may be refilled with the solutions. In one embodiment, the solution reservoir 162 is similar to an inkjet cartridge receptacle that contains inkjet-like elements containing shampoo, soap, antiseptic and/or perfume solution that may be introduced into the wash tub during operation of the automated animal washing system.

Figure 16:
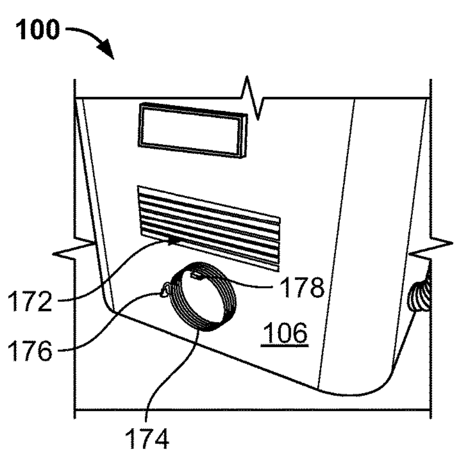
FIG. 16 shows the base of FIG. 15 including the vent and a power cord for providing electrical power to the automated animal washing system, in accordance with one embodiment.

In one embodiment, the automated animal washing system 100 preferably includes one or more controllers, circuit boards, programs, motors, engines, pumps and/or valves for operating the automated animal washing system. Referring to FIGS. 15 and 16, in one embodiment, the base 106 of the automated animal washing system 100 includes one or more vents 172 disposed around the perimeter of the base 106 that enable hot air generated by the controllers, circuit boards, programs, motors, engines, pumps and/or valves to be vented from the base.

Figure 17:
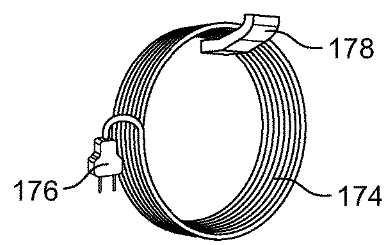
FIG. 17 shows the power cord of FIG. 16 and a hook for securing the power cord to the base of the automated animal washing system.

Referring to FIGS. 16 and 17, in one embodiment, the automated animal washing system 100 includes a power cord 174 that may be plugged into a power socket for providing electrical power to the automated animal washing system. In one embodiment, the base 106 of the automated animal washing system 100 includes a power cord hook 178 that enables the power cord 174 to be wound and stored at the rear of the base 106.

Figure 18:
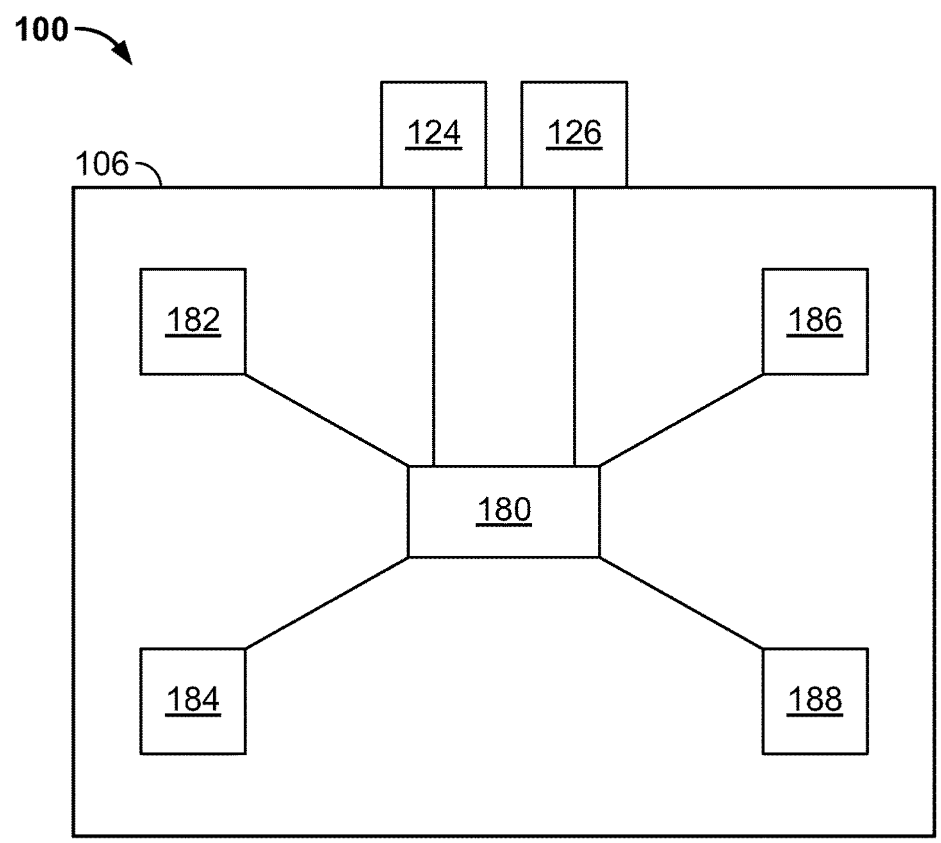
FIG. 18 shows a schematic view of a control system for an automated animal washing system, in accordance with one embodiment.

Referring to FIG. 18, in one embodiment, an automated animal washing system 100 preferably includes a system controller 180 that is in communication with the water level controller 124 and the timer controller 126. In one embodiment, the system controller 180 desirably includes a central processing unit containing one or more operational protocols for controlling operation of the automated animal washing system, one or more memory devices, and circuitry for controlling operation of the automated animal washing system. In one embodiment, the automated animal washing system 100 includes a first motor 182 in communication with the system controller 180 for controlling operation of the agitator 162 (FIG. 5C) disposed at the bottom of the wash tub 108. In one embodiment, the first motor 182 preferably controls the rotation of the agitator located at the bottom of the wash tub.

In one embodiment, the automated animal washing system 100 desirably includes at least one pump 184 for drawing water into the wash tub and discharging water from the wash tub. The pump 184 may also move water and solutions through the system including through the water pipes, the shampoo pipe(s), the antiseptic pipe(s), and the perfume pipe(s).

In one embodiment, the automated animal washing system 100 includes a liquid dispensing motor 186 that controls the amount of shampoo, soap, antiseptic, and perfume introduced into the wash tub. The motor 188 may move solutions through the system including through the shampoo pipe(s), the antiseptic pipe(s), and the perfume pipe(s).

In one embodiment, the automated animal washing system 100 includes a hot air generator 188 that generates hot air that is introduced into the wash tub via the hot air blowers 160A, 160B (FIG. 14).

In one embodiment, the system controller 180 is in communication with and controls operation of the first motor 182, the pump 184, the second motor 186, and the hot air generator 188. The system controller 180 preferably includes one or more protocols for operating the motors, pumps and generators in accordance with the established protocols.

In one embodiment, the automated animal washing system 100 is made of plastic and is designed to wash, sterilize, dry and perfume domestic animals. The automated animal washing system may come in different sizes depending on the size of the animals that will be placed inside the animal cage and the wash tub such as small, medium, large and very large sizes.

In one embodiment, the automated animal washing system 100 comprises plastic. In one embodiment, the wash tub may be made of a transparent plastic.

In one embodiment, an automated animal washing system includes six vertically extending pipes for introducing water into the wash tub. In one embodiment, the water pipes are preferably made of durable materials such as aluminum, stainless steel, and/or plastic. In one embodiment, the water introducing pipes have a length of about 15-16 inches and more preferably about 15.74 inches and a diameter of about 0.50-0.70 inches and more preferably about 0.59 inches. In one embodiment, the water introducing pipes have openings formed along the length thereof having a diameter of about 0.09 inches for introducing water into the wash tub. In one embodiment, the six water introducing pipes are adapted to pump about 12 gallons into the wash tub in less than 60 seconds.

In one embodiment, the automated animal washing system includes a shampoo introducing pipe disposed inside the wash tub. In one embodiment, the shampoo introducing pipe is made of durable material such as aluminum, stainless steel and/or plastic. In one embodiment, the shampoo introducing pipe has a length of about 15.74 inches, a diameter of about 0.59 inches, and a plurality of holes having a diameter of about 0.09 inches that extend along the length of the shampoo introducing pipe. In one embodiment, a sufficient quantity of shampoo is dispensed inside the wash tub in about 10 seconds.

In one embodiment, an automated animal washing system includes an antiseptic pipe disposed inside the wash tub for introducing antiseptic inside the wash tub. In one embodiment, the antiseptic introducing pipe is made of a durable material such as aluminum, stainless steel, and/or plastic. In one embodiment, the antiseptic introducing pipe has a length of about 15.74 inches, a diameter of about 0.59 inches, and includes a plurality of holes provided along the length thereof having a diameter of about 0.09 inches. In one embodiment, the holes provided along the length of the antiseptic introducing tube enable a sufficient quantity of antiseptic to be introduced into the wash tub in about 10 seconds.

In one embodiment, an automated animal washing system includes a perfume introducing pipe disposed inside the wash tub. In one embodiment, the perfume introducing tube is made of a durable material such as aluminum, stainless steel, and/or plastic. In one embodiment, a perfume introducing pipe has a length of about 15.74 inches, a diameter of about 0.59 inches, and includes a plurality of holes along the length thereof having a diameter of about 0.09 inches. In one embodiment, a sufficient quality of perfume is introduced through the holes in about 10 seconds.

In one embodiment, the drain is provided in the body of the wash tub. In one embodiment, the drain has an outer diameter of about 0.96 inches. In one embodiment, the automated animal washing system includes a filter aligned with the drain for removing hair and/or impurities from the water being drained from the wash tub. In one embodiment, the agitator rotates for mixing water in a circular motion inside the wash tub. In one embodiment, the size of the agitator and the blades associated therewith may change depending upon the size of the automated animal washing system. In one embodiment, the lid that covers the opening at the upper end of the wash tub has a first lid half and a second lid half with a lid opening having a width of about 2.75 inches extending between the first and second lid halves. The lid opening between the first and second lid halves preferably provides an opening in the lid for moving the dispensing end of a faucet into alignment with the space in dispensing water, shampoo, soap, antiseptic, and/or perfume solution into the top of the automated animal washing system. In one embodiment, each lid half has a length of about 11.81 inches and a width of about 5.51 inches. In one embodiment, the underside of each lid half preferably includes hot air blowers adapted to introduce hot air at about 50° C. into the upper end of the wash tub. In one embodiment, the hot air introduced into the wash tub moves toward the bottom of the wash tub and then exits from the wash tub via the space between the first and second lid halves and the vents formed at the upper end of the wash tub. In one embodiment, a complete drying process lasts about 4 minutes.

In one embodiment, the first and second carrying handles of the automated animal washing system have a length of about 3.93 inches and a width and height of about 0.39 inches.

In one embodiment, the first motor for operating the agitator provides sufficient power to rotate the blades of the agitator to move the volume of water inside the wash tub. In one embodiment, the first motor rotates the agitator to move the water in a clockwise or counterclockwise direction.

In one embodiment, the pump for drawing water into the wash tub and dispensing water from the wash tub is sufficient to fill up the wash tub to a level of 12 gallons in about 60 seconds and to later discharge the water from the wash tub in about 60 seconds.

In one embodiment, the shampoo, soap, antiseptic, and perfume solution dispenser motor is sufficient to draw the shampoo, soap, antiseptic and perfume from the storage reservoir and introduce it into the wash tub via the shampoo pipe, antiseptic pipe and perfume pipe.

In one embodiment, the hot air generator provides sufficient power for producing hot air at 50° C. and introducing it for more than 420 seconds into the wash tub.

In one embodiment, all of the four motors, pumps and generators disclosed herein sit in the base of the automated animal washing system. In one embodiment, the base of the automated animal washing system has a height of about 11.81 inches. In one embodiment, the base of the automated animal washing system includes one or more vents for discharging heat and/or hot air generated by the motors, pumps and generators disposed inside the base.

In one embodiment, the animal cage is made of aluminum with rods that do not hinder the free flow and movement of water within the wash tub. In one embodiment, the spacing between each rod is about 0.78 inches so that the water may flow freely between the spaced rods.

In one embodiment, the animal cage has four spaced legs that are inserted into four spaced receptacles formed in the bottom of the wash tub. The cross-sectional diameters of the spaced legs are less than the respective inner diameters of the spaced receptacles so that the legs may fit within the receptacles of the wash tub. In one embodiment, when the animal cage is inserted into the wash tub, the bottom of the cage is located about 1.96 inches above the bottom of the wash tub. The interaction between the legs of the animal cage and the receptacles in the bottom of the wash tub provides a very stable connection between the animal cage and the wash tub so that the animal cage does not move as the water is circulated by the agitator.

In one embodiment, the power cord has a length of about 78.74 inches.

In one embodiment, the first water inlet hose has an inner diameter of about 0.78 inches. In one embodiment, the water inlet hose is made of a flexible material such as a flexible rubber material able to withstand water pressure and stretching. In one embodiment, a free end of the water inlet tube is adapted to be connected to a water faucet to introduce water into the system.

In one embodiment, the water discharge hose has similar properties as the water inlet hose is utilized for discharging water from the wash tub. In one embodiment, the free end of the water discharge tube may be connected with a sink to drain water from the wash tub.

In one embodiment, an animal is placed inside the animal cage and the cage top is closed over the cage bottom. In one embodiment, the door of the dome is open so that the animal's head and neck may pass through the door opening and be located above the cage top. In one embodiment, the cage containing the animal is inserted into the opening of the upper end of the wash tub with the legs of the cage inserted into the depressions at the bottom of the wash tub. The lid may be closed over the cage and the opening at the upper end of the wash tub. The automated animal washing system may be activated for introducing water, shampoo, soap, antiseptic, and/or perfume into the wash tub. The agitator may be activated for circulating the water inside the wash tub. New batches of water may be repeatedly introduced into and dispensed from the wash tub for using different water batches. In one embodiment, the water is drained from the wash tub and the hot air generator is activated for blowing hot air onto the animal inside the cage for drying the animal.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. An automated animal washing system comprising:

a housing having a base;

a wash tub positioned atop said base, said wash tub having an open upper end, a closed lower end, and a side wall extending between the upper and lower ends;

a lid moveable between a closed position for covering the open upper end of said wash tub and an open position for providing access to the open upper end of said wash tub;

at least one water pipe for introducing water into said wash tub;

a shampoo pipe for introducing shampoo into said wash tub;

a rotatable agitator disposed at the lower end of said wash tub for circulating water inside said wash tub;

a drain disposed at the lower end of said wash tub for removing water from said wash tub;

a cage disposed inside said wash tub, said cage having spaced legs that project from a bottom of said cage for spacing said bottom of said cage away from said rotatable agitator;

a control system disposed in said base for automatically operating said animal washing system.

2. The system as claimed in claim 1, wherein said side wall of said wash tub is transparent and has a cylindrical shape.

3. The system as claimed in claim 2, wherein said closed lower end of said wash tub has a bottom wall that forms a water tight seal with said cylindrical shaped side wall.

4. The system as claimed in claim 3, wherein said rotatable agitator projects above said bottom wall of said wash tub, and wherein said drain is positioned over an opening formed in said bottom wall of said wash tub.

5. The system as claimed in claim 4, further comprising water tight receptacles formed in said bottom wall of said wash tub that receive said spaced legs of said cage.

6. The system as claimed in claim 5, wherein each said spaced leg has a length that is greater than the length of said receptacle associated therewith so that said bottom of said cage is spaced away from said rotatable agitator that projects above said bottom wall of said wash tub.

7. The system as claimed in claim 1, wherein said cage comprises:

a cage top overlying said bottom of said cage, wherein said cage top is moveable between a closed position for covering an open upper end of said bottom of said cage and an open position for providing access to the open upper end of said bottom of said cage.

8. The system as claimed in claim 7, wherein said cage top has a top wall with a central opening and a door moveable between a closed position for covering said central opening and an open position for providing access to said central opening.

9. The system as claimed in claim 8, wherein said cage comprises spaced metal rods that are joined together, and wherein said spaced metal rods enable water to pass through said cage.

10. The system as claimed in claim 1, further comprising at least one hot air blower located on an underside of said lid.

11. The system as claimed in claim 10, wherein said lid is bifurcated into first and second lid halves that open and close independently of one another, wherein said at least one hot air blower comprises a first hot air blower located on an underside of said first lid half and a second hot air blower located on an underside of said second lid half, and wherein said lid further comprises a lid opening extending between said first and second lid halves.

12. The system as claimed in claim 11, further comprising a faucet secured to said housing, said faucet having a dispensing end moveable between a first position in which said dispensing end of said faucet is aligned with said lid opening and a second position in which said dispensing end of said faucet is not in alignment with said lid opening.

13. The system as claimed in claim 1, wherein said wash tub comprises a plurality of spaced vent openings formed in said side wall adjacent the open upper end of said wash tub.

14. The system as claimed in claim 1, further comprising:

a water inlet tube coupled with said housing and being in communication with said at least one water pipe for supplying water to said wash tub;

a water outlet tube coupled with said housing and being in communication with said drain for removing water from said wash tub.

15. The system as claimed in claim 1, wherein said at least one water pipe comprises a plurality of water pipes disposed inside said wash tub and being coupled with a source of water, wherein each said water pipe extends vertically between the upper and lower ends of said wash tub, and wherein each said water pipe has a plurality of spaced openings for introducing water into said wash tub.

16. The system as claimed in claim 15, wherein said shampoo pipe is disposed inside said wash tub and is coupled with a source of shampoo, wherein said shampoo pipe extends vertically between the upper and lower ends of said wash tub, and wherein said shampoo pipe has a plurality of spaced openings for introducing shampoo into said wash tub.

17. The system as claimed in claim 16, further comprising:

a disinfectant pipe disposed inside said wash tub and being coupled with a source of disinfectant, wherein said disinfectant pipe extends vertically between the upper and lower ends of said wash tub, and wherein said disinfectant pipe has a plurality of spaced openings for introducing disinfectant into said wash tub; and a perfume pipe disposed inside said wash tub and being coupled with a source of perfume, wherein said perfume pipe extends vertically between the upper and lower ends of said wash tub, and wherein said perfume pipe has a plurality of spaced openings for introducing perfume into said wash tub.

18. The system as claimed in claim 17, further comprising a solution reservoir located on said housing, wherein said solution reservoir includes a shampoo compartment for supplying the shampoo to said shampoo pipe, a disinfectant compartment for supplying the disinfectant to said disinfectant pipe, and a perfume compartment for supplying the perfume to said perfume pipe.

19. The system as claimed in claim 18, further comprising:

Said control system being in communication with a water level controller and a timer controller, said control system including a central processing unit containing one or more operational protocols for controlling operation of said automated animal washing system, one or more memory devices, and circuitry for controlling operation of said automated animal washing system;

a first motor in communication with said control system for controlling operation of said rotatable agitator disposed in said wash tub;

at least one pump for drawing water into said wash tub and discharging water from said wash tub;

a liquid dispensing motor that controls the amount of shampoo, disinfectant, and perfume introduced into said wash tub; and a hot air generator that generates hot air that is introduced into said wash tub via said at least one hot air blower, wherein said control system is in communication with and controls operation of said first motor, said pump, said second motor, and said hot air generator, and wherein said control system includes one or more protocols for operating said first and second motors, said pump, and said hot air generator.

20. An automated animal washing system comprising:

a housing having a base;

a plastic wash tub positioned atop said base, said plastic wash tub having an open upper end, a closed lower end, and a transparent side wall extending between the upper and lower ends;

a lid covering the open upper end of said wash tub, wherein said lid is moveable from a closed position to an open position for accessing the open upper end of said wash tub;

a water inlet for introducing water into said wash tub;

a rotatable agitator disposed at the lower end of said plastic wash tub for circulating water inside said wash tub;

a drain disposed at the lower end of said wash tub for removing water from said wash tub;

an animal cage disposed inside said wash tub, said animal cage having legs that project from a bottom of said animal cage for spacing said bottom of said animal cage away from said rotatable agitator;

a faucet coupled with said housing and having a dispensing end that overlies said lid and said animal cage;

a control system disposed in said base that contains one or more programs for automatically operating said animal washing system.

* * * * *